US012720386B2

(12) United States Patent
Vijayakumar et al.

(10) Patent No.: US 12,720,386 B2
(45) Date of Patent: Aug. 25, 2026

(54) METHODS AND SYSTEMS FOR ENHANCED MOBILITY FOR VOICE CALLS IN A NEW RADIO BAND

(71) Applicant: T-Mobile USA, Inc., Bellevue, WA (US)

(72) Inventors: Maheswaran Vijayakumar, Brambleton, VA (US); Ravindra Wasalwar, Ashburn, VA (US); Srinivas Rao Kanyagundla, Herndon, VA (US); Amembal Vikram Pai, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 571 days.

(21) Appl. No.: 17/900,754

(22) Filed: Aug. 31, 2022

(65) Prior Publication Data

US 2024/0073758 A1 Feb. 29, 2024

(51) Int. Cl.

*H04W 36/06* (2009.01)
*H04W 36/00* (2009.01)
*H04W 36/16* (2009.01)
*H04W 72/0453* (2023.01)

(52) U.S. Cl.

CPC ....... *H04W 36/06* (2013.01); *H04W 36/0069* (2018.08); *H04W 36/16* (2013.01); *H04W 72/0453* (2013.01)

(58) Field of Classification Search

None

See application file for complete search history.

(56) References Cited

U.S. PATENT DOCUMENTS 11,206,548 B2 12/2021 Zhu et al.
2020/0008069 A1* 1/2020 Zhu ...................... H04W 76/16

* cited by examiner

*Primary Examiner* — Kouroush Mohebbi
(74) *Attorney, Agent, or Firm* — Lee & Hayes, P.C.

(57) ABSTRACT

Methods and systems for enhanced mobility for voice calls in a new radio band are disclosed. According to an implementation, data services and/or multimedia services may be provided to a user equipment (UE) through a 5G new radio (NR) in a standalone (SA) mode. During the ongoing data service, the UE may receive a voice call in the current NR band. If the current NR band does not support the voice call, the UE may search and acquire a new NR band capable of providing the voice call. The UE may further set the new NR band as the serving cell and transfer the current data radio bearers (DRBs) assigned for the ongoing data service to the new NR band. While the UE receives new DRBs assigned for the voice call, the UE continues the data service and the voice call in the new NR band.

20 Claims, 10 Drawing Sheets

METHODS AND SYSTEMS FOR ENHANCED MOBILITY FOR VOICE CALLS IN A NEW RADIO BAND

BACKGROUND

The Fifth generation (5G) network opens up new opportunities for voice services and the way in which they are delivered. Voice over new radio (VoNR) can leverage the low latency benefits of the 5G technology to deliver seamless voice services to mobile users. However, in the current implementation of 5G networks, when a voice call is received or initiated from a new radio (NR) band that does not support the voice services (also referred to as a non-VoNR band), the voice call is detoured to the 4G/LTE network via an evolved packet system fallback (EPS-FB) scheme. This could potentially cause throughput reduction because all the data radio bearers (DRBs), including DRBs assigned for ongoing data services, are redirected to the 4G/LTE network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
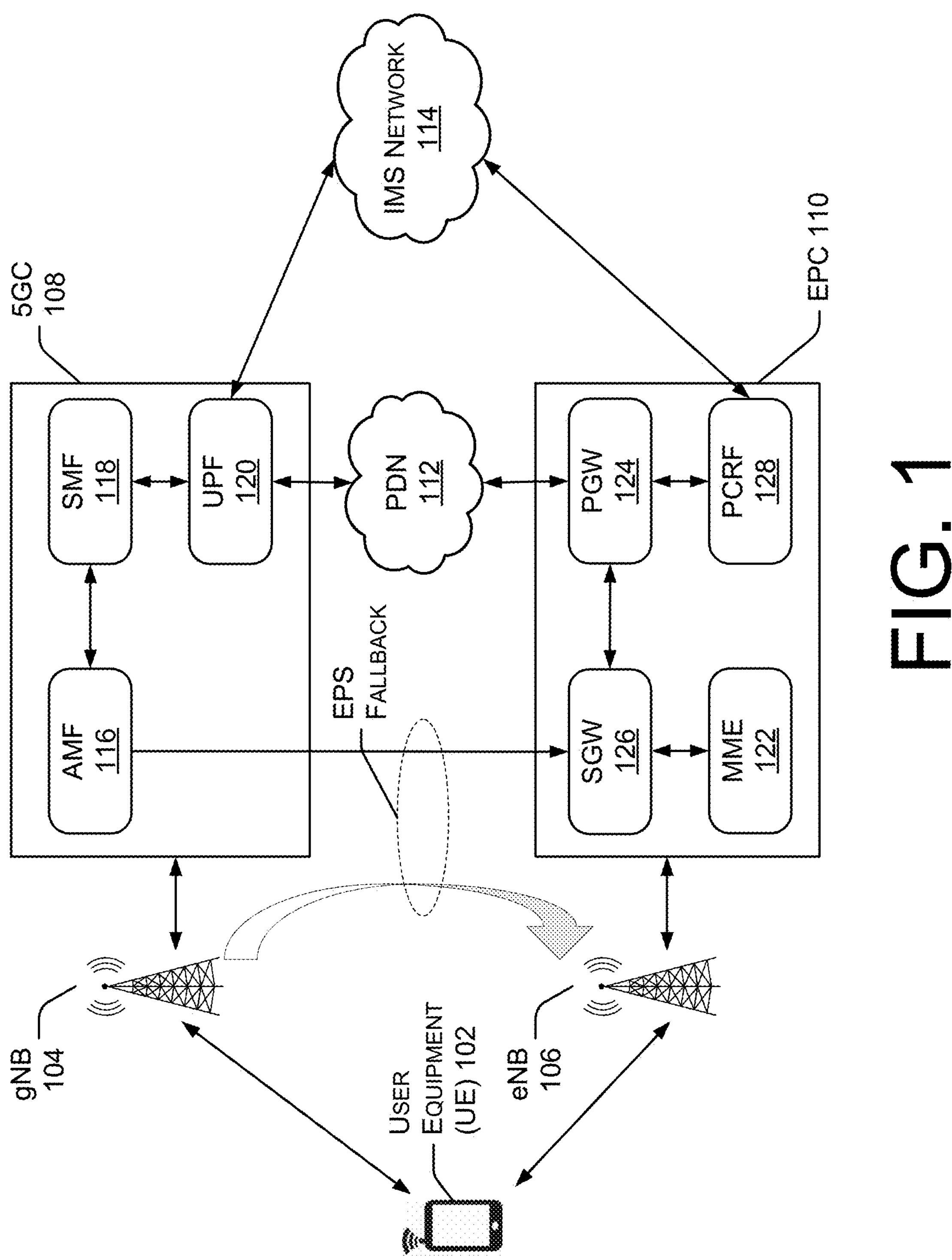
FIG. 1 illustrates an example network scenario, in which methods for enhanced mobility for voice calls in a new radio band are implemented according to an existing technique.

Techniques for enhanced mobility for voice calls in a 5G new radio band are disclosed herein. In some implementations, a method for implementing the enhanced mobility for voice calls in a 5G new radio band may be implemented on a user equipment (UE). The UE may be any device that can wirelessly connect to a telecommunication network. In some examples, the UE may be a mobile phone, such as a smart phone or other cellular phone. In other examples, the UE may be a personal digital assistant (PDA), a media player, a tablet computer, a gaming device, a smart watch, a hotspot, a personal computer (PC) such as a laptop, desktop, or workstation, or any other type of computing or communication device. In yet other examples, the UE may include the computing devices implemented on the vehicle including but are not limited to, an autonomous vehicle, a self-driving vehicle, or a traditional vehicle capable of connecting to internet. In yet other examples, the UE may be a wearable device and/or wearable materials, such as a smart watch, smart glasses, clothes made of smart fabric, etc. In further examples, the UE may be a virtual reality or augmented reality goggles or glasses. The UE may support various radio access technologies such as Bluetooth, Wi-Fi, GSM, CDMA, WCDMA, UMTS, 4G/LTE or 5G new radio (NR).

As discussed herein, the 5G NR may operate in a standalone mode. In the standalone mode, the UE connects to the new 5G core network infrastructure through the 5G NR. The UE may register on an Internet Protocol (IP) multimedia subsystem (IMS) network to use the multimedia services including but not limited to, data service, rich communication service (RCS), voice service, video streaming, etc. The request for registration may be transmitted through the 5G core network to a proxy call session control function (P-CSCF) of the IMS network. Once the registration is complete, a protocol data unit (PDU) session may be established between the UE and the IMS network.

In implementations, during an ongoing data service session, the UE may receive a voice all in the 5G NR band. Alternatively, during the ongoing data service session, the UE may initiate a voice call in the 5G NR band. The UE may determine whether the current 5G NR band is capable of supporting the voice service. If the current 5G NR band can support the voice service, a voice call may be set up in the current 5G NR band. If the current 5G NR band is not configured to support the voice service, the UE may search and acquire a second 5G NR band that is capable of supporting the voice service. As the current 5G NR acts as the serving cell of the UE for the ongoing data service, the UE changes the serving cell from the current 5G NR to the second 5G NR.

In implementations, the UE may further receive a data radio bearer (DRB) assigned by a gNodeB. The voice call may be further established in the second 5G NR and the data packets associated with the voice call may be transmitted via the corresponding DRB. In implementations, the ongoing data service carried by the current 5G NR may be also associated with one or more DRBs assigned in the current 5G NR. The UE may transfer the one or more DRBs to the second 5G NR to continue the data service session in the second 5G NR.

In an existing scheme, when the voice call is received in a 5G NR band that does not support the voice service, the voice call may fall back to the evolved packet system (EPS) connection including a radio access technology (RAT) handover from 5G NR to LTE. The EPS fallback scheme may cause a quality of service to degrade due to the RAT change. As the current 5G NR and the second 5G NR are both new radios in a standalone mode, the switching of the serving cell from one NR band to another has minimum impact on the data service carried therein.

In some examples, the 5G NR may use carrier aggregation, in which, one or more 5G NR frequency bands may be aggregated together to be assigned to the same UE to increase the data rate. During the initial registration, the UE may select a component carrier of the aggregated band as a primary serving cell. The rest of the component carriers are all set as secondary serving cells. In between a data service session, the UE may need to use the voice service, either by initiating a voice call or by receiving a voice all. If the primary serving cell is not enabled to support the voice service, the UE may re-select a component carrier that can support the voice service and set the re-selected component carrier as the primary serving cell. The previous primary serving cell may be changed to the secondary serving cell.

Similar to 5G NR with no carrier aggregation, the UE may further receive the DRB assigned for the voice service in the primary serving cell to transmit the data packets associated with the voice service. The UE may also transfer the DRB assigned for the ongoing data service from the previous primary serving cell to the new primary serving cell such that the data service can be continued in the new primary serving cell.

In implementations, the DRB may be mapped to one or more QoS flows. In some examples, the data packets associated with different types of services may be transmitted according to various QoS requirements. In some other examples, the data packets associated with different types of services may be transmitted in different guaranteed bit rates (GBRs).

The techniques discussed herein may be implemented in a computer network using one or more of protocols including but are not limited to Ethernet, 3G, 4G, 4G LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which methods for enhanced mobility for voice calls in a new radio band are implemented according to an existing technique.

The network scenario 100, as illustrated in FIG. 1, may include a telecommunication network of a wireless service provider such as, T-Mobile, AT&T, Sprint, Verizon Wireless, etc. The telecommunication network may include one or more access networks and one or more core networks.

The one or more access networks may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology. As illustrated in FIG. 1, the one or more access networks may include gNB 104, a base station associated with a 5G radio access network (RAN) and eNB 106, a base station associated with a 4G/LTE RAN. Although not shown, the network scenario 100 may also include other types of base stations, for example, 2G base stations and/or 3G NodeBs that are associated with GSM and CDMA access network. In some examples, the one or more access networks may include digital subscriber line (DSL) and variations of DSL technology that provide access to desktops, workstations, and/or mainframes. In yet other examples, the one or more access networks may include Wi-Fi connections to the user equipment.

The core network may be referred to as a backbone network of the telecommunication network. The network scenario 100 may include one or more core networks, such as, a 5G core network, i.e., the 5GC 108 for 5G radio access technology, and an evolved packet core network, i.e., the EPC 110 for 4G/LTE radio access technology.

In some examples, the network scenario 100 may also include a public data network (PDN) 112 and an IMS network 114. The PDN 112 may be a public data network established for providing data transmission service for the public. The IMS network 114 may be configured to deliver voice (VoIP) and other multimedia services over an IP packet-switched network (e.g., the PDN 112).

The 5G core network (e.g., 5GC 108) may implement a plurality of 5G network functions including but not limited to, an access and mobility management function (AMF) 116, a session management function (SMF) 118, a user plan function (UPF) 118, etc. The AMF 116 may be configured to receive the service requests from the UE 102 connected to the 5GC 108 via gNB 104. The AMF 116 may forward the requests over an N11 interface to the SMF 118. The AMF 116 may determine which SMF is suitable to handle the requests by querying a network repository function (NRF). The SMF 118 may be configured to establish, update and release the protocol data unit (PDU) sessions, and interact with the UPF 120 to manage session context.

The 4G/LTE core network (e.g., EPC 110) may implement a plurality of 4G/LTE network functions including but not limited to, a mobility management entity (MME) 122, a packet data network gateway (PGW) 124, a serving gateway (SGW) 126, a policy and charging rules function (PCRF) 128, etc. The MME 122 may be configured to provide mobility session management for the LTE network and support subscriber authentication, roaming and handovers to other networks. The PGW 124 may be configured to act as an interface between the EPC 110 and other packet data networks such as the PDN 112 or the IMS network 114. The SGW 126 may be configured to route and forward the user data packets to and from the eNB 106 and the PGW 124. The SGW 126 may also be responsible for inter-eNB handovers and provide mobility between LTE and other types of networks, such as between the LTE network and the 2G/3G network. The PCRF 128 may be configured to determine the policy rules in the IMS network 114, support service data flow detection, policy enforcement and flow-based charging.

Frequency bands for 5G new radio may be separated into two different frequency ranges. Frequency Range 1 (FR1) includes frequency bands from 450 MHz to 6 GHz, some of which overlaps the LTE frequency range. Frequency Range 2 (FR2) includes frequency bands from 24.25 GHz to 52.6 GHz. The duplex mode may include frequency division duplex (FDD) and time division duplex (TDD).

A user or a subscriber may access the resources or use the service provided through the telecommunication network using a user equipment (UE) 102. The UE 102 nowadays may support various radio access technologies (RATs) such as Bluetooth, Wi-Fi, GSM, CDMA, WCDMA, UMTS, 4G/LTE or 5G new radio (NR).

In 5G scenario, the UE 102 may connect to the 5G core network through the base station (e.g., gNB 104) to use the data services. Like previous generations, the 5G core network (e.g., 5GC 108) connects the UE 102 to external data networks (e.g., PDN 112). The UE 102 may register through the 5G core network prior to use the data service. A protocol data unit (PDU) session is established to provide end-to-end user plane activity between the UE 102 and a specific data network through the user plane function (e.g., UPF120). The 5G NR band that carries the ongoing PDU session may not be a VoNR enabled band. When the UE 102 initiates a voice call or receives a voice call on the 5G NR band, the voice call may be transferred to the 4G/LTE core network (e.g., EPC 110) during the call setup, including a RAT change from the 5G NR band to an LTE band. In implementations, the request for the voice service is transferred from the AMF 116 of the 5G core network to the SGW 126 of the 4G/LTE core network. The handover of the VoIP service from 5G NR to LTE may be referred to as an evolved packet system (EPS) fallback scenario. Under such a scenario, a voice over 5G NR band (VoNR) service falls to a voice over LTE (VOLTE) service. The EPS fallback scenario may degrade the data service quality as the data radio bearer (DRB) assigned to the ongoing data service is transferred from the 5G NR band to the LTE band. To address this problem, the present disclosure utilizes the 5G NR band in a standalone (SA) operation mode to support the VoNR service.

It should be appreciated that the network scenario 100 is for the purpose of illustration. The present disclosure is not intended to be limiting. The 5G core network (e.g., 5GC 108) and the 4G/LTE core network (e.g., EPC 110) may each include one or more network functions other than those shown in FIG. 1. For example, the 5GC 108 may also include an authentication server function (AUSF), a network slice selection function (NSSF), a unified data management (UDM), a network repository function (NRF), a policy control function (PCF), a network exposure function (NEF), etc. The EPC 110 may also include the home subscriber server (HSS) that supports various IMS functions to handle calls and sessions.

Figure 2:
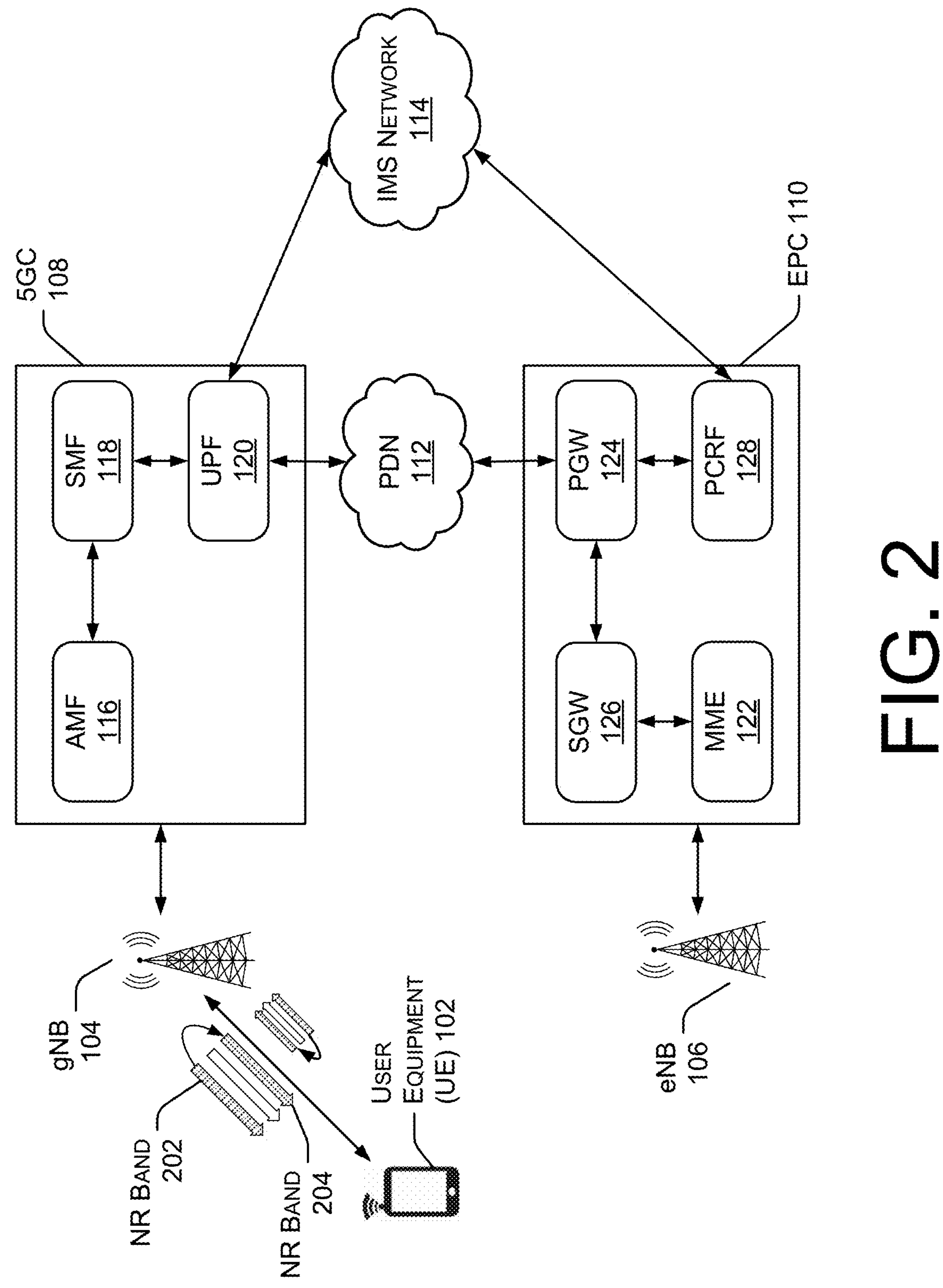
FIG. 2 illustrates an example network scenario, in which methods for enhanced mobility for voice calls in a new radio band are implemented according to an example of the present disclosure.

FIG. 2 illustrates an example network scenarios, in which methods for enhanced mobility for voice calls in a new radio band are implemented according to an example of the present disclosure.

The network scenario 200 of FIG. 2 illustrates a 5G NR operating in a standalone mode with no carrier aggregation. Unlike the non-standalone mode, in which, the UE 102 uses the 5G NR access network overlaid on an existing 4G/LTE core network, the UE 102 connects to the 5G NR access network (e.g., gNB 104) on a brand new 5G core network in a standalone mode.

In some examples, the UE 102 may search and acquire a 5G NR frequency band (e.g., NR band 202) during the initial registration procedure, e.g., upon the UE 102 is powered on. The acquired 5G NR frequency band may fall in FR1 (450 MHZ~6 GHz) or FR2 (24.25 GHz~52.6 GHz) and include an uplink channel and a downlink channel. The NR band 202 may be set as a serving cell of the UE 102. Once the 5G NR frequency band is acquired, the UE 102 camps in the NR band 202 to further complete the registration in the 5G core network (e.g., 5GC 108) and the IMS network 114. A PDU session may be further established in the NR band 202 for the data services or other multimedia services requested by the UE 102. The gNB 104 may further set up a data radio bearer (DRB) for the data services or other multimedia services for the UE 102.

During an ongoing data service, the UE 102 may receive a voice call or initiates a voice call in the NR band 202. The UE 102 may determine whether the NR band 202 is configured to support the voice service. When it is determined that the NR band 202 does not support the voice service, the UE 102 may reselect a 5G NR frequency band (e.g., NR band 204) that is capable of providing the voice service. The UE 102 may change the serving cell from the NR band 202 to the NR band 204. The 5G core network (e.g., 5GC 108) may set up a quality of service (QoS) flow with a 5G QoS Identifier (5QI) of 5 for the calling UE to carry Session Initiation Protocol (SIP) signaling, and the gNB 104 may set up the corresponding data radio bearer (DRB) for the voice call.

As discussed herein, the NR band 202 carries the DRB previously assigned for the data services or other multimedia services. Because the serving cell changes from the NR band 202 to the NR band 204, the DRB previously assigned for the data services or other multimedia services is also transferred to the NR band 204. Therefore, while establishing the voice call in the NR band 204, the ongoing data services or other multimedia services are seamlessly transitioned to the NR band 204. As the services (i.e., the voice service, the data service, other multimedia service, etc.) are provided through the 5G access network and the 5G core network rather than falling back to the LTE core network, the impact on the service quality is decreased.

Figure 3:
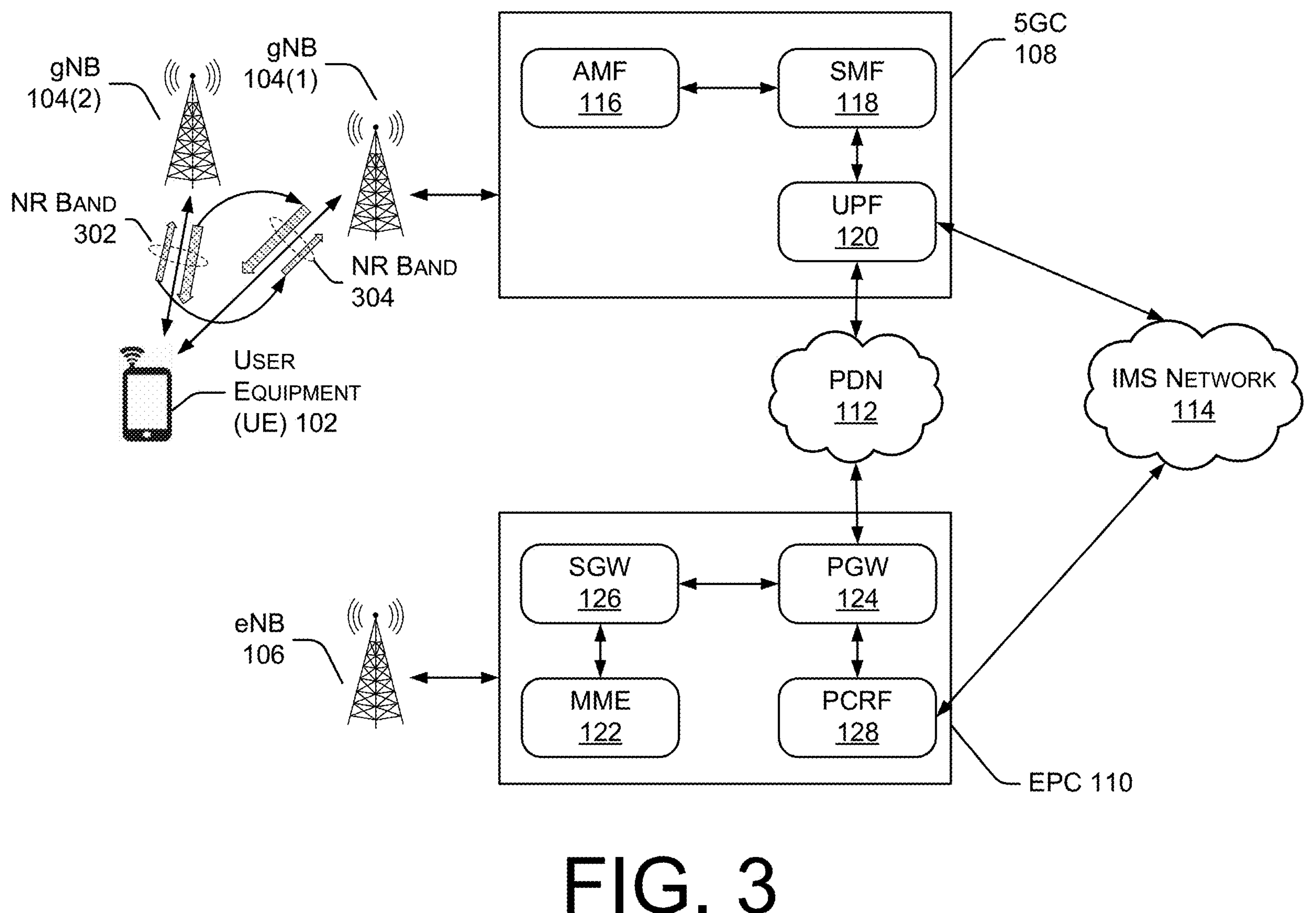
FIG. 3 illustrates an example network scenario, in which methods for enhanced mobility for voice calls in a new radio band are implemented according to another example of the present disclosure.

FIG. 3 illustrates an example network scenarios, in which methods for enhanced mobility for voice calls in a new radio band are implemented according to another example of the present disclosure. The network scenario 300 of FIG. 3 also illustrates a 5G NR operating in a standalone mode with no carrier aggregation.

As discussed herein, during the 5G NR frequency band search (also referred to as 5G NR cell search), the UE 102 may measure the signal strength or the signal quality matrix of various frequency bands and select a serving cell based on the measurement. In implementations, the UE 102 may measure the signal strength of various beams sent by the gNodeB. In some examples, the UE 102 may measure the signal strength of various beams sent by a signal gNodeB and select/re-select a serving cell associated with the signal gNodeB, as illustrated in FIG. 2. In some other examples, the signals from two or more gNodeBs can be detected by the UE 102. Thus, based on the measurement of the signal strength of various beams from the two or more gNodeBs, the UE 102 may re-select the serving cell from a gNodeB different from the gNodeB that the UE 102 is currently attached to.

As illustrated in FIG. 3, the signals from gNB 104(1) and gNB 104(2) are both detected by the UE 102. During the initial registration, the UE 102 connects to the gNB 104(2) through the NR band 302. The NR band 302 is set as the serving cell for the UE 102 to use the data services and/or multimedia services. When the UE 102 needs to use the voice service and the NR band 302 does not support the voice service, the UE 102 may re-select a VoNR enabled band (e.g., NR band 304) associated with the gNB 104(1) as the serving cell. The UE 102 further establishes the voice call in the NR band 304 and transfers the DRB assigned for the data service and/or multimedia services from the NR band 302 to the NR band 304.

Figure 4:
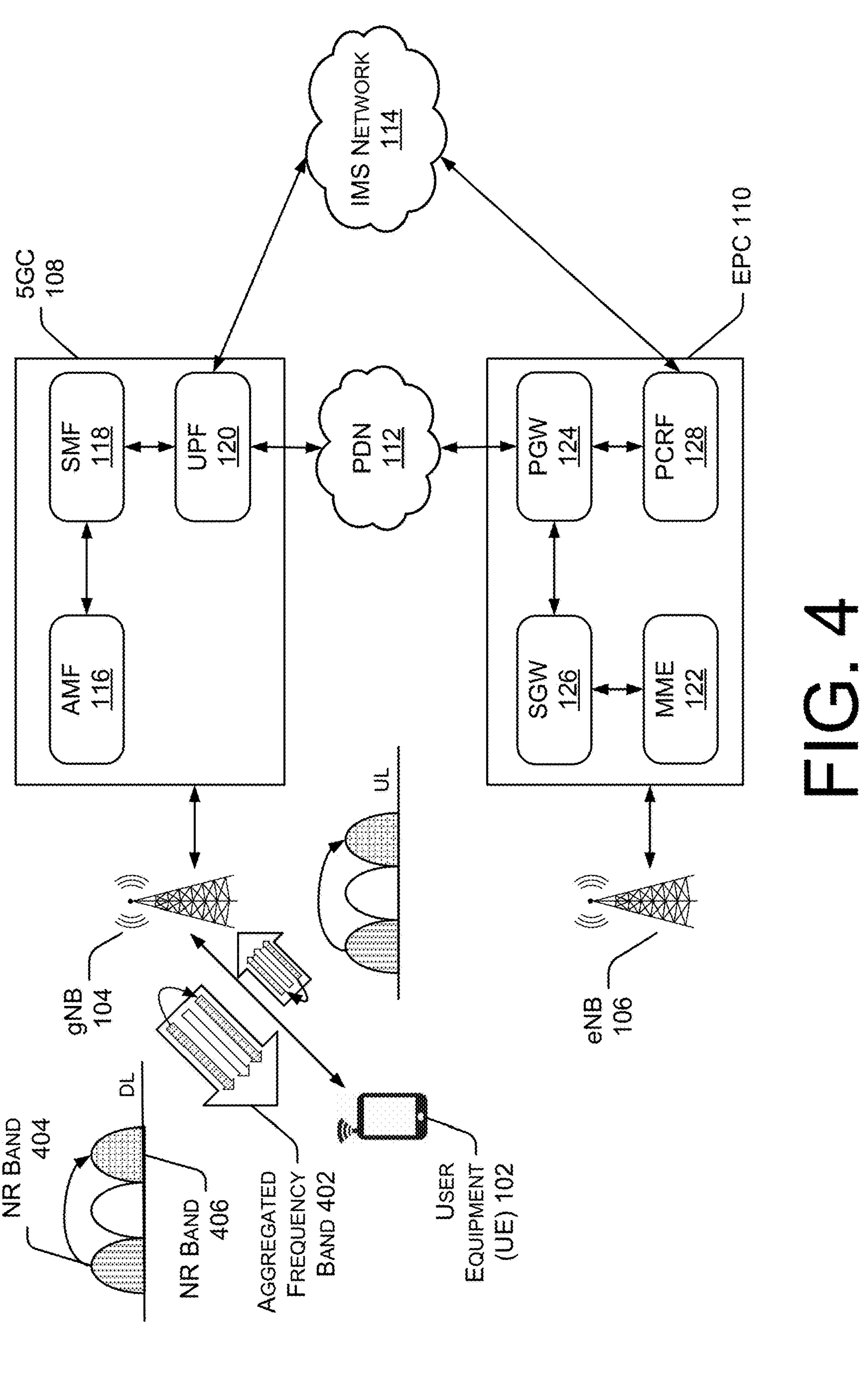
FIG. 4 illustrates an example network scenario, in which methods for enhanced mobility for voice calls in a new radio band are implemented according to yet another example of the present disclosure.

FIG. 4 illustrates an example network scenarios, in which methods for enhanced mobility for voice calls in a new radio band are implemented according to yet another example of the present disclosure.

The network scenario 400 of FIG. 4 illustrates a 5G NR operating in a standalone mode with carrier aggregation. In carrier aggregation (CA), each aggregated carrier is referred to as a component carrier (CC). In the example of FIG. 4, an aggregated frequency band 402 is configured to include a plurality of component carriers associated with a single gNodeB (e.g., gNB 104). Among the plurality of component carriers, the NR band 404 is set as the primary serving cell for the UE 102 during the initial registration. All other carrier components (e.g., 5G NR bands) in the aggregated band are set as secondary serving cells.

As discussed herein, when the UE 102 initiates a voice call or receives a voice call in the primary serving cell (e.g., NR band 404), the UE 102 determines whether the primary serving cell is capable of supporting the voice service. When the primary serving cell is not capable of supporting the voice service, the UE 102 may select, from the secondary serving cells, a frequency band (e.g., NR band 406) that is capable of supporting the voice service. The UE 102 may re-configure the aggregated frequency band 402 as a reconfigured aggregated frequency band. For example, the UE 102 may set the newly selected NR band 406 as the primary serving cell and the NR band 404 as the secondary serving cell. The UE 102 may continue to provide the data service and the voice call on the reconfigured aggregated frequency band. In implementations, the UE 102 further continues the voice call and any ongoing data services on the NR band 406 by transferring the DRB assigned for the ongoing data services from the NR band 404 to the NR band 406. The switch of the primary serving cell and the secondary serving cell includes the switch of the frequency bands for both uplink channel and downlink channel.

It should be appreciated that the carrier aggregation example shown in FIG. 4 is for the purpose of illustration. The present disclosure is not intended to be limiting. In some implementation (as shown in FIG. 4), the aggregation can be arranged to use continuous component carriers within the same frequency band, i.e., intra-band contiguous CA. In another implementation, the component carriers may belong to the same operating frequency band but have one or more gaps in between (also referred to as intra-band, non-contiguous CA). In yet other implementations, the component carriers may belong to different operating frequency bands (also referred to as inter-band, non-contiguous CA).

Figure 5:
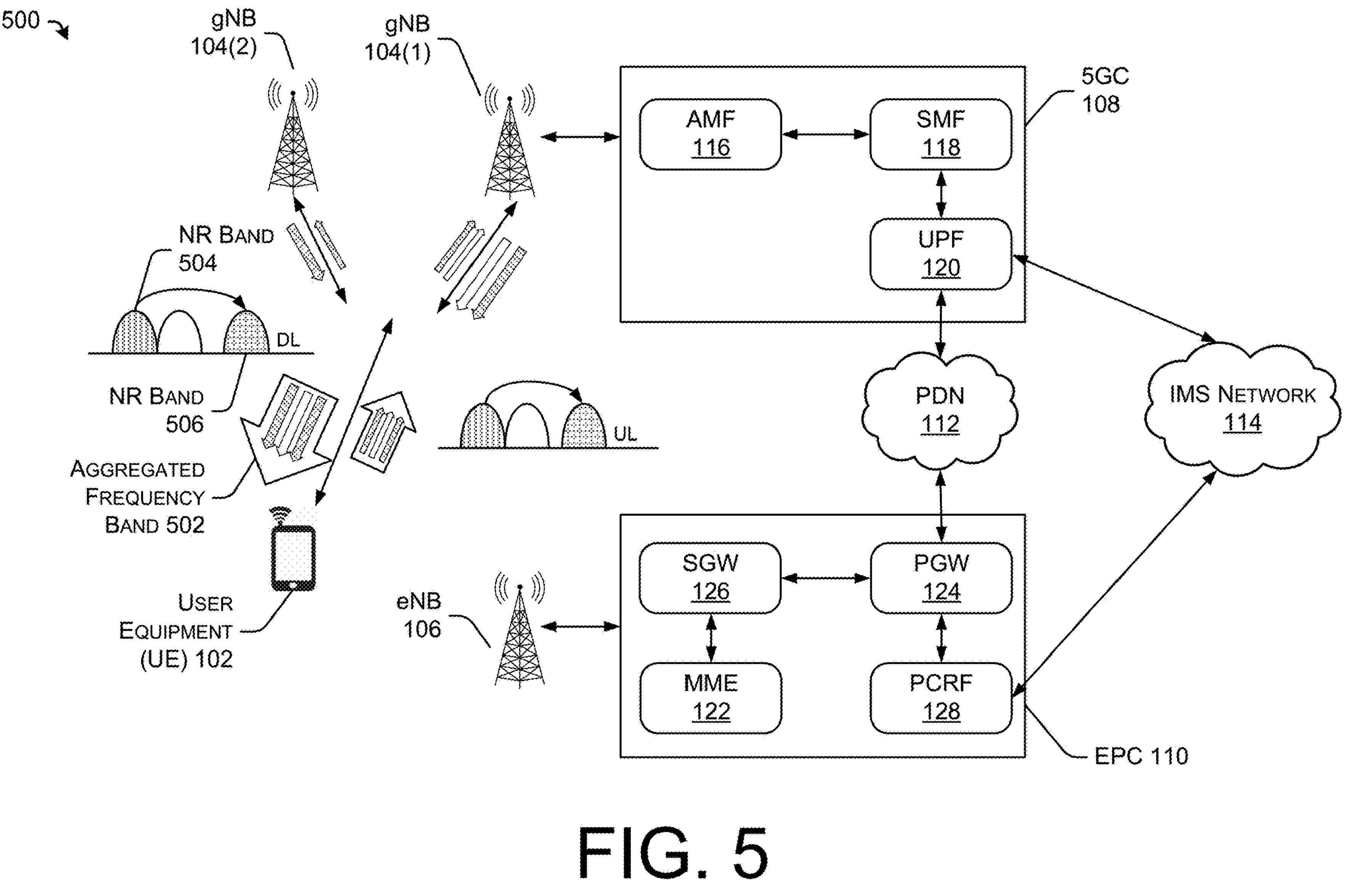
FIG. 5 illustrates an example network scenario, in which methods for enhanced mobility for voice calls in a new radio band are implemented according to yet another example of the present disclosure.

FIG. 5 illustrates an example network scenarios, in which methods for enhanced mobility for voice calls in a new radio band are implemented according to yet another example of the present disclosure.

The network scenario 500 of FIG. 5 also illustrates a 5G NR operating in a standalone mode with carrier aggregation. In the example of FIG. 5, an aggregated frequency band 502 is configured to include a plurality of component carriers associated with gNB 104(1) and gNB 104(2). Among the plurality of component carriers, the NR band 504 associated with gNB 104(1) is set as the primary serving cell for the UE 102 during the initial registration. All other component carriers in the aggregated band are set as secondary serving cells.

When the UE 102 initiates a voice call or receives a voice call in the primary serving cell, e.g., NR band 504, the UE 102 determines whether the primary serving cell is capable of supporting the voice service. When the primary serving cell is not capable of supporting the voice service, the UE 102 may determine that one of the secondary serving cells, e.g., NR band 506, is capable of supporting the voice service. The UE 102 may re-configure the aggregated frequency band 402 as a reconfigured aggregated frequency band. For example, the UE 102 may set the newly selected NR band 506 as the primary serving cell and the NR band 504 as the secondary serving cell. The switch of the primary serving cell and the secondary serving cell includes the switch of the frequency bands for both uplink channel and downlink channel. In implementations, the UE 102 further transfers the DRB assigned for the ongoing data services from the NR band 504 to the NR band 506.

It should be appreciated that the network scenarios 400 and 500, as respectively shown in FIG. 4 and FIG. 5, are for the purpose of illustration. The present disclosure is not intended to be limiting. The aggregated frequency band may include more or fewer component carriers than those being illustrated. The aggregation is also not limited to intra-band, contiguous aggregation, but may also include intra-band, non-contiguous aggregation, and inter-band, non-contiguous aggregation, etc.

Figure 6:
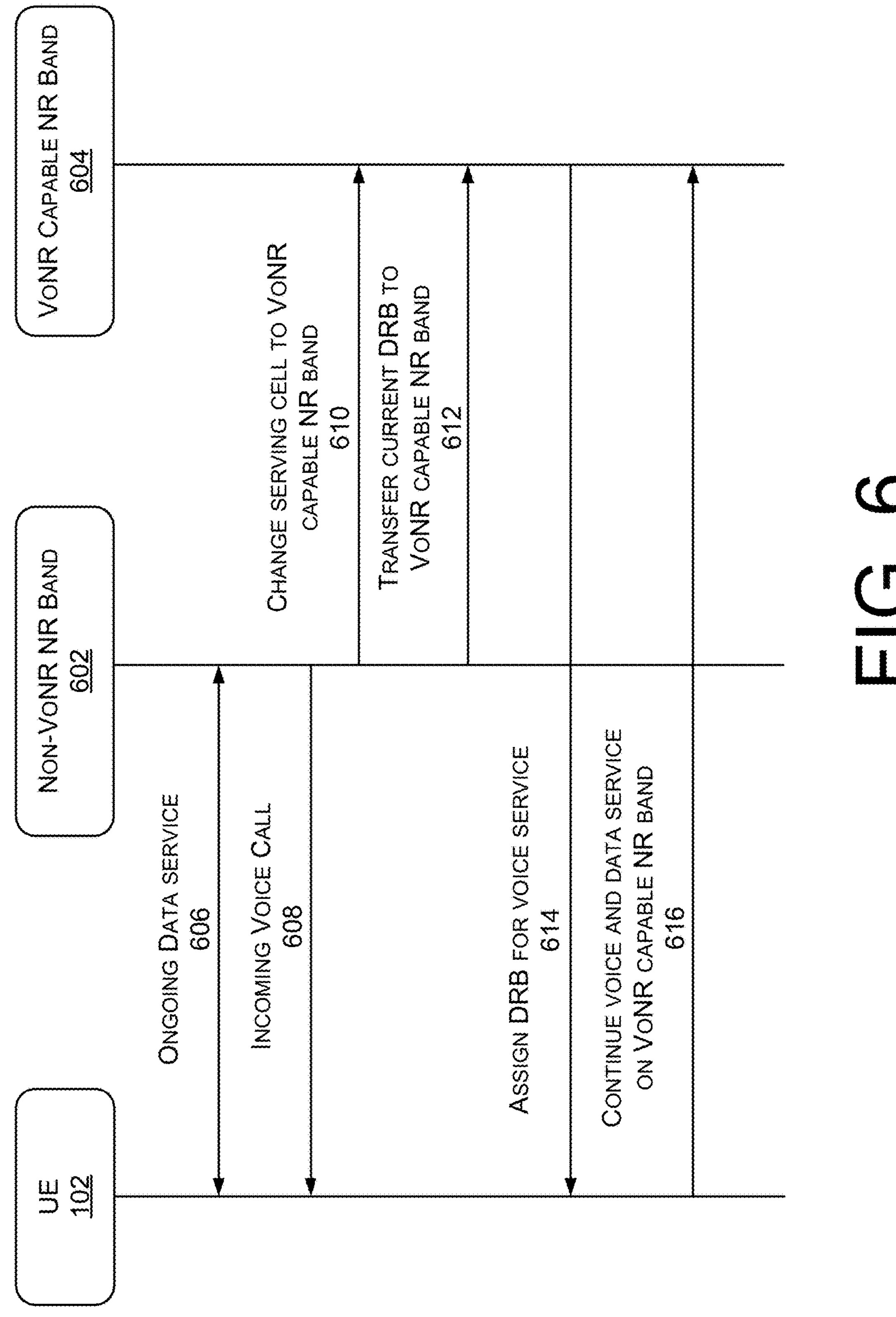
FIG. 6 illustrates an example process for enhanced mobility for voice calls in a new radio band are implemented according to an example of the present disclosure.

FIG. 6 illustrates an example process for enhanced mobility for voice calls in a new radio band are implemented according to an example of the present disclosure. According to the process 600, the 5G new radios operate in a standalone (SA) mode with no carrier aggregation.

As illustrated in FIG. 6, an ongoing data service 606 is provided to the UE 102 through a non-VoNR NR band 602. The non-VoNR NR band 602 operates as a standalone NR and acts as a serving cell for the UE 102. Although not shown, between the UE 102 and a data network (e.g., the PDN 112 of FIG. 1), PDU sessions and service data flows (SDFs) may be established on the user plane. In some examples, PDU sessions are set up individually for Internet activities/apps, mobile apps, and IMS, within which, each application is assigned with a corresponding SDF. For example, if the Internet activates/apps include user browsing a website, streaming a video or downloading a large file from a Cloud server, the PDU established for Internet activities/apps may include three SDFs. Each SDF may be mapped to a QoS flow based on different QoS requirement of various Internet activities/apps. In some examples, multiple SDFs may be mapped to a same QoS flow. On the radio interface, e.g., non-VoNR NR band 602, the QoS flows are mapped to data radio bearers (DRBs) that are configured to deliver the service in a certain QoS level. Multiple QoS flows may be mapped to a single DRB. Therefore, in implementations, the ongoing data service 606 may be associated with one or more DRBs.

The UE 102 may further receive an incoming voice call 608 in the Non-VoNR NR band 602. In some examples, the UE 102 may initiate a voice call to a destination UE, which triggers a request for voice services over 5G NR. As the serving cell, i.e., Non-VoNR NR band 602 is not configured to support the voice services, the UE 102 may search for another 5G standalone new radio band that can support the voice services. The UE 102 may perform a cell level measurement and/or a beam level measurement during the search for the VoNR standalone new radio band. In some examples, the 5G standalone new radio bands available to the UE 102 are associated with one or more gNodeBs. The UE 102 may select a VoNR standalone NR band associated with the gNodeB that the UE 102 is currently connected to. Alternatively, the UE102 may select a VoNR standalone NR band associated with a different gNodeB.

Once the VoNR capable NR band is acquired, the UE 102 camps in the VoNR capable NR band 604 and changes the serving cell to the VoNR capable NR band at 610. The UE 102 may further transfer the current DRB to the VoNR capable NR band at 612. The current DRB is assigned for the ongoing data service 606 and may include multiple DRBs.

The gNodeB may further assign a DRB associated with the voice service for the UE 102 at 614. The UE 102 may continue both voice and data service on the VoNR capable NR band at 616.

Figure 7:
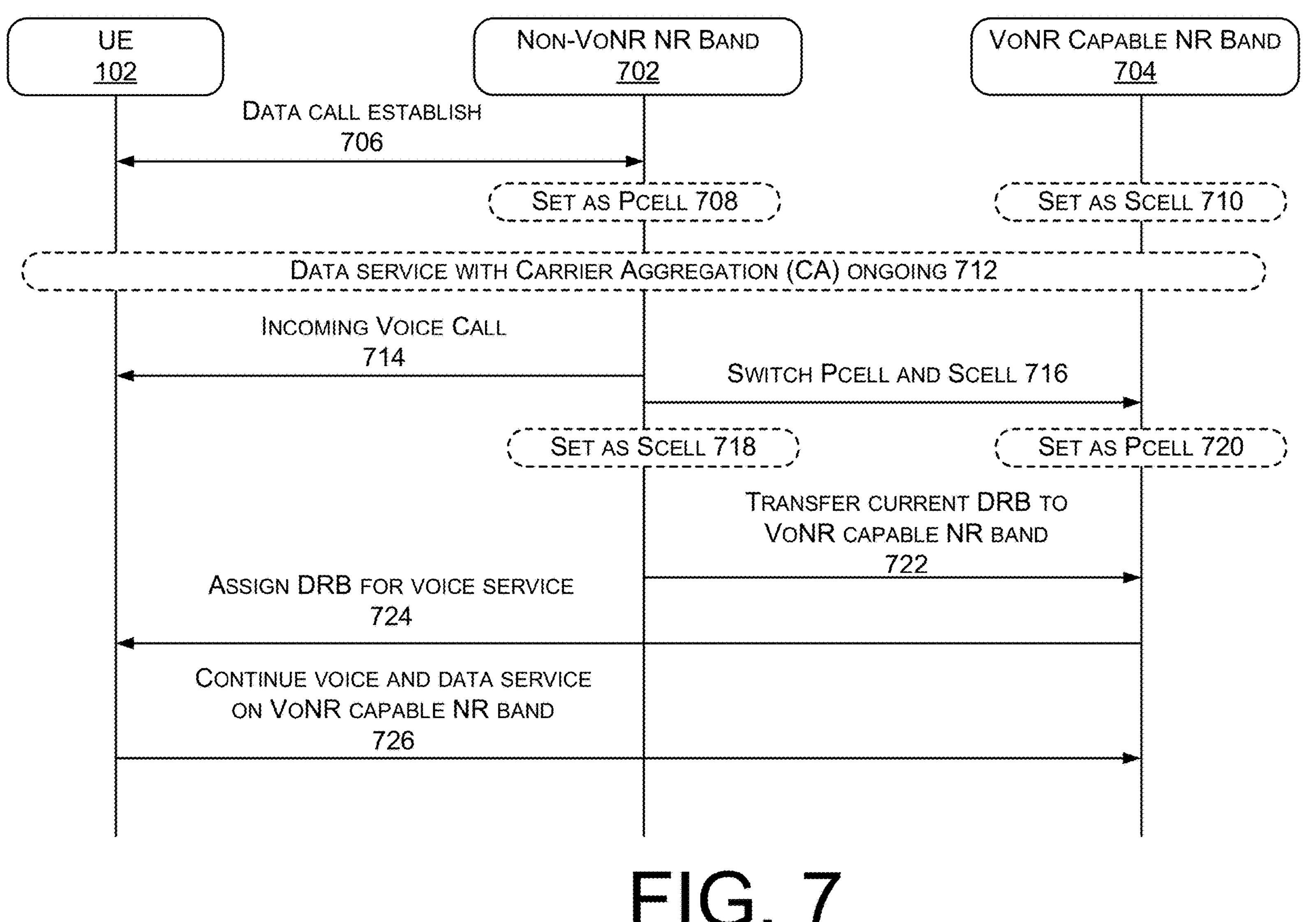
FIG. 7 illustrates an example process for enhanced mobility for voice calls in a new radio band are implemented according to yet another example of the present disclosure.

FIG. 7 illustrates an example process for enhanced mobility for voice calls in a new radio band are implemented according to yet another example of the present disclosure.

The network scenario 400 of FIG. 4 illustrates a 5G NR operating in a standalone mode with carrier aggregation.

As illustrated in FIG. 7, a data call 706 is established for the UE 102 in Non-VoNR NR band 702. In implementations, the UE 102 may register on the IMS network through the 5G core network before the data service is established. One or more DRBs may be assigned to the UE 102 according to the data services being used. The Non-VoNR NR band 702 may be set as a primary serving cell (Pcell) for the UE 102 at 708. As carrier aggregation is used in this example, all other NR bands (i.e., the carrier component) in the aggregated channel are set as secondary serving cells (Scells) at 710. The ongoing data service with carrier aggregation is further provided through the aggregated channel at 712.

As discussed herein, the UE 102 may receive an incoming voice call 714 in the Non-VoNR NR band 702. As the Non-VoNR NR band 702 does not support the voice service, the UE 102 searches for a VoNR capable NR band from the carrier components of the aggregated channel. Similar to the 5G new radio standalone mode with no carrier aggregation, the UE 102 performs a cell level measurement and/or a beam level measurement. In some examples, the component carriers available to the UE 102 are associated with one or more gNodeBs. The UE 102 may select a component carrier associated with the gNodeB that the UE is currently connected to. Alternatively, the UE102 may select a component carrier associated with a different gNodeB.

Once the VoNR capable NR band is acquired from the aggregated channel, the UE 102 may switch the roles of Pcell and Scell for the Non-VoNR NR band 702 and the VoNR capable NR band 704 at 716. The UE 102 may set the Non-VoNR NR band 702 as the Scell at 718 and set the VoNR capable NR band 704 as the Pcell at 720. The UE 102 may further transfer the current DRB to the VoNR capable NR band at 722. The gNodeB may further assign a DRB associated with the voice service for the UE 102 at 724. The UE 102 further continues both voice and data service on the VoNR capable NR band at 726.

Figure 8:
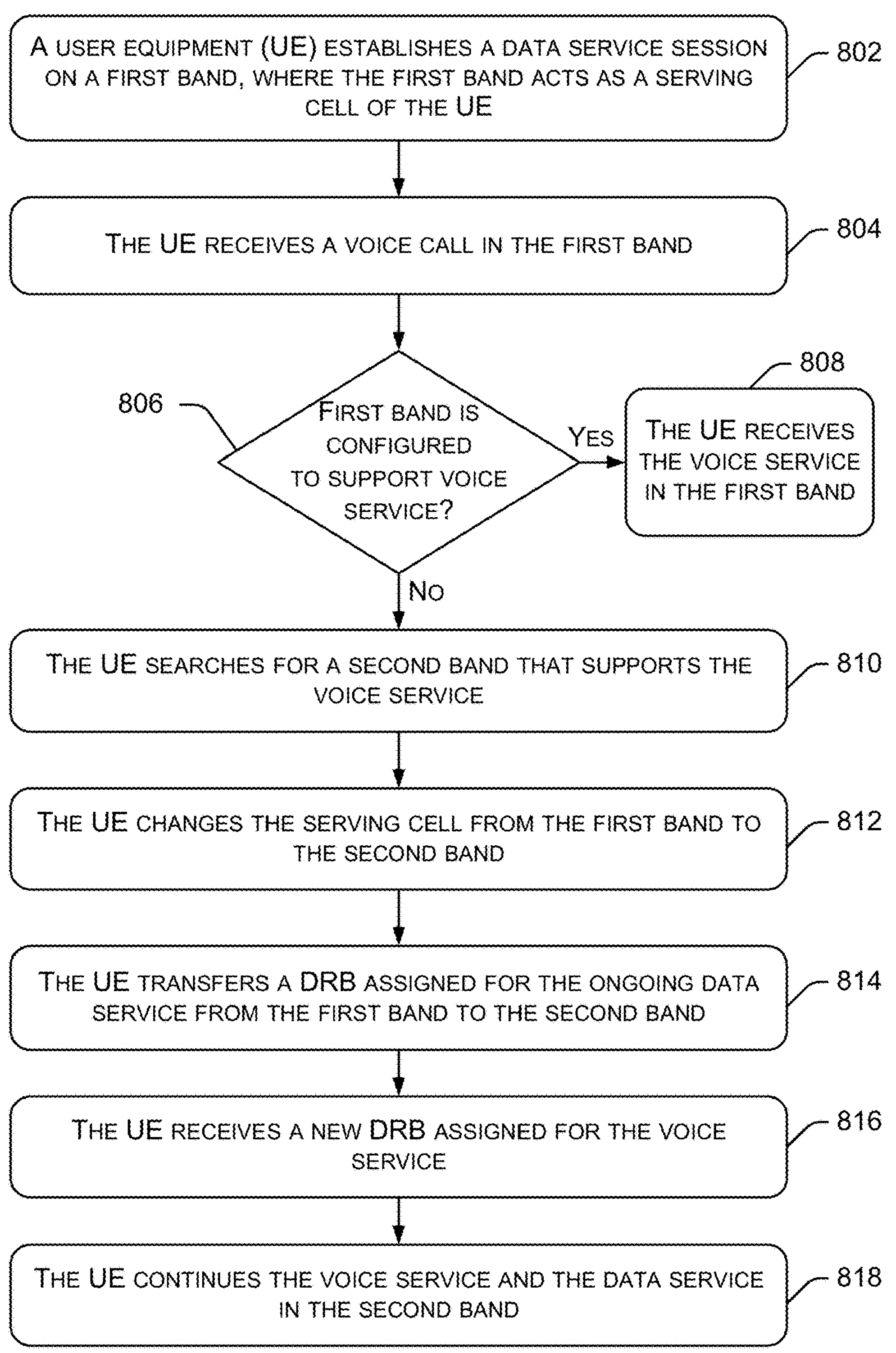
FIG. 8 illustrates an example flowchart for enhanced mobility for voice calls in a new radio band are implemented according to an example of the present disclosure.

FIG. 8 illustrates an example flowchart for enhanced mobility for voice calls in a new radio band are implemented according to an example of the present disclosure. The example flowchart 800 corresponds to the example network scenarios, as illustrated in FIGS. 2-3 and the example process, as illustrated in FIG. 6, wherein the 5G NR operates in a standalone mode with no carrier aggregation.

At operation 802, a user equipment (UE) may establish a data service session on a first band, where the first band acts as a serving cell of the UE. The UE may be any electronic equipment capable of connecting to the telecommunication network, as described with respect to the UE 102 of FIGS. 1-7. In some examples, the first band may include a 5G new radio (NR) in a standalone (SA) mode. Based on the request from the UE, one or more PDU sessions may be established between the UE and the data network (e.g., PDU 112 of FIGS. 1-5). By way of example and without limitation, the type of the PDU sessions may include IPv4, IPv6, IPv4v6, Ethernet, and unstructured. An established PDU session may be modified and/or released based on the request from the UE and/or the 5G core network by exchanging the signaling between the UE and the session management function (e.g., SMF 118 of FIGS. 1-5) of the 5G core network.

At operation 804, the UE may receive a voice call in the first band. In an alternative implementation, the UE may initiate a voice call in the first band.

At operation 806, the UE may determine whether the first band is configured to support the voice service. If the first band is configured to support the voice service, that is, the first band is a VoNR enabled band, the UE may receive the voice service in the first band at operation 808.

If the first band is not configured to support the voice service, the UE may search a second band that supports the voice service at operation 810. In some examples, the second band also is a 5G new radio in a standalone (SA) mode. The UE may perform a cell search and acquisition procedure to re-select a 5G SA NR to support the incoming voice call. Based at least in part on the signal strength received at the UE and the QoS parameters, the UE may select the second band associated with the gNodeB that the UE is currently connected to. In some examples, the UE may receive signals from the antennas of different gNodeBs. The UE may select the second band that is associated with a different gNodeB.

At operation 812, the UE may change the serving cell from the first band to the second band.

At operation 814, the UE may transfer a DRB assigned for the ongoing data service from the first band to the second band. As discussed herein, a data radio bearer may carry one or more QoS flows, which correspond to one or more service data flows.

At operation 816, the UE may receive a new DRB assigned for the voice service. In implementations, the gNodeB (e.g., gNB 104 in FIGS. 1-5) maps the DRB to the QoS flow based on the QoS flow ID (QFI) and the associated QoS profiles (i.e., QoS parameters and QoS characteristics).

At operation 818, the UE may continue the voice service and the data service in the second band. In some examples, the data associated with the voice call and the data service may be transmitted in the second band in guaranteed bit rates (GBRs), respectively.

Figure 9:
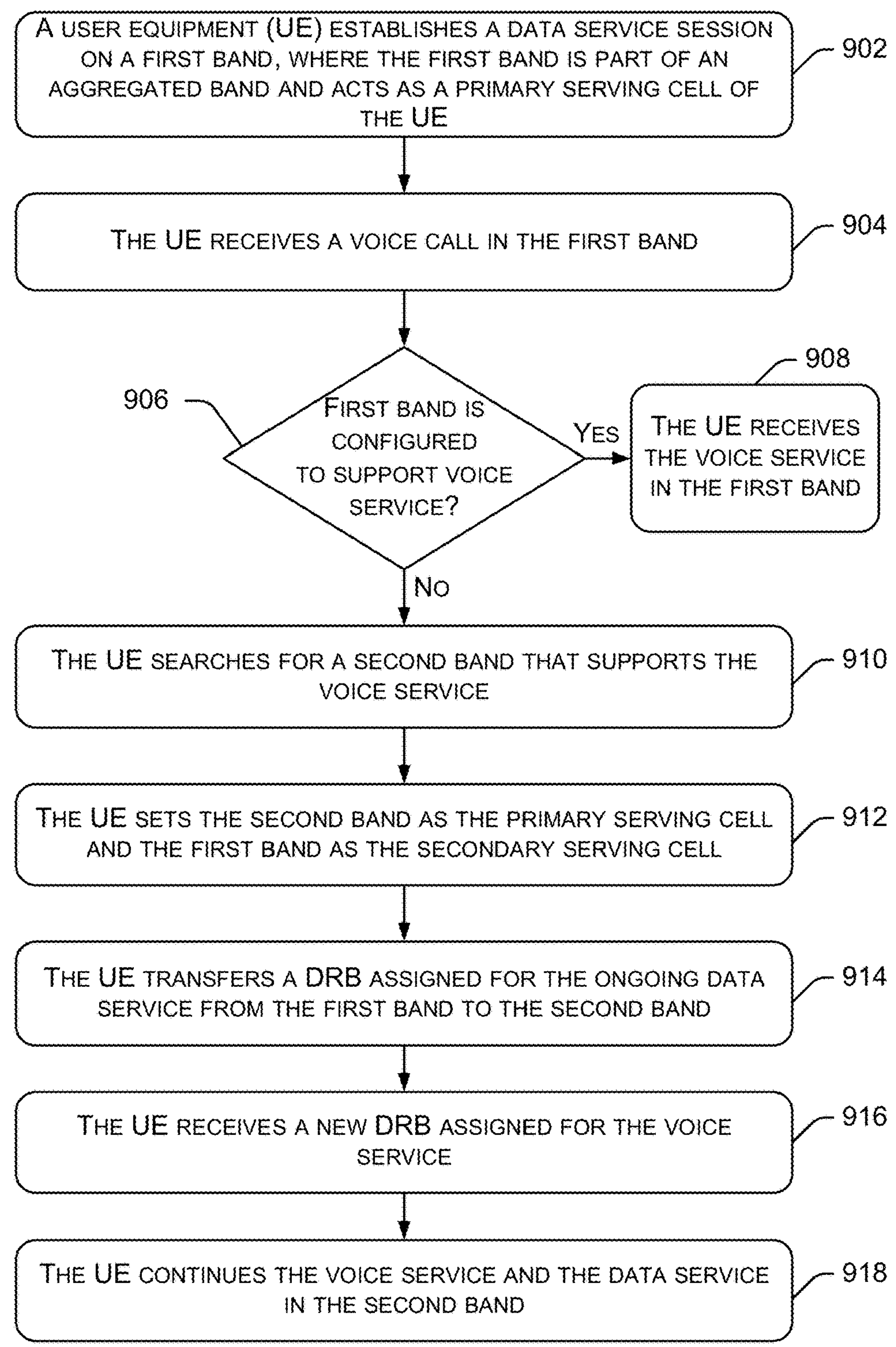
FIG. 9 illustrates an example flowchart for enhanced mobility for voice calls in a new radio band are implemented according to yet another example of the present disclosure.

FIG. 9 illustrates an example flowchart for enhanced mobility for voice calls in a new radio band are implemented according to yet another example of the present disclosure. The example flowchart 900 may correspond to the example network scenarios, as illustrated in FIGS. 4-5 and the example process, as illustrated in FIG. 7, wherein the 5G NR operates in a standalone mode with carrier aggregation.

At operation 902, a user equipment (UE) may establish a data service session on a first band, where the first band is part of an aggregated band and acts as a primary serving cell of the UE. As discussed herein, the 5G NR operates in a standalone mode with carrier aggregation. During the initial registration, the UE may search the bands in the aggregated channel, acquire the first band and set the first band as the primary serving cell. All other bands in the aggregated channel are set as secondary serving cells.

At operation 904, the UE may receive a voice call in the first band.

At operation 906, the UE may determine whether the first band is configured to support the voice service. If the first band is configured to support the voice service, the UE may receive the voice service in the first band at operation 908.

If the first band is not configured to support the voice service, the UE may search for a second band that supports the voice service at operation 910. Similar to the example flowchart 800 of FIG. 8, the UE may select the second band based on the signal strength received at the UE and the QoS parameters. In some examples, the carrier aggregation may be intra-band, contiguous CA, in which the component carriers within the same frequency band are continuously allocated. In some other examples, the carrier aggregation may be intra-band, non-contiguous CA, in which the component carriers within the same frequency band are allocated to have one or more gaps in between. In yet other implementations, the component carriers may belong to different operating frequency bands (also referred to as inter-band, non-contiguous CA). In some examples, the second band may fall in the same frequency range as the first band. In some other example, the second band may be in a different frequency range from the first band.

At operation 912, the UE may set the second band as the primary serving cell and the first band as the secondary serving cell.

At operation 914, the UE may transfer a DRB assigned for the ongoing data service from the first band to the second band. In some examples, the ongoing data service may be assigned with multiple DRBs to transmit the data packets.

At operation 916, the UE may receive a new DRB assigned for the voice service.

At operation 918, the UE may continue the voice service and the data service in the second band.

Although the example flowchart 800 and the example flowchart 900 are depicted as including a number of operations and/or an apparent flow of operations, the example flowchart 800 and the example flowchart 900 may each include more or less operations, repeat operations, and/or one or more of the operations may be conducted serially, in parallel, and/or in a different order than that shown in the figures.

Figure 10:
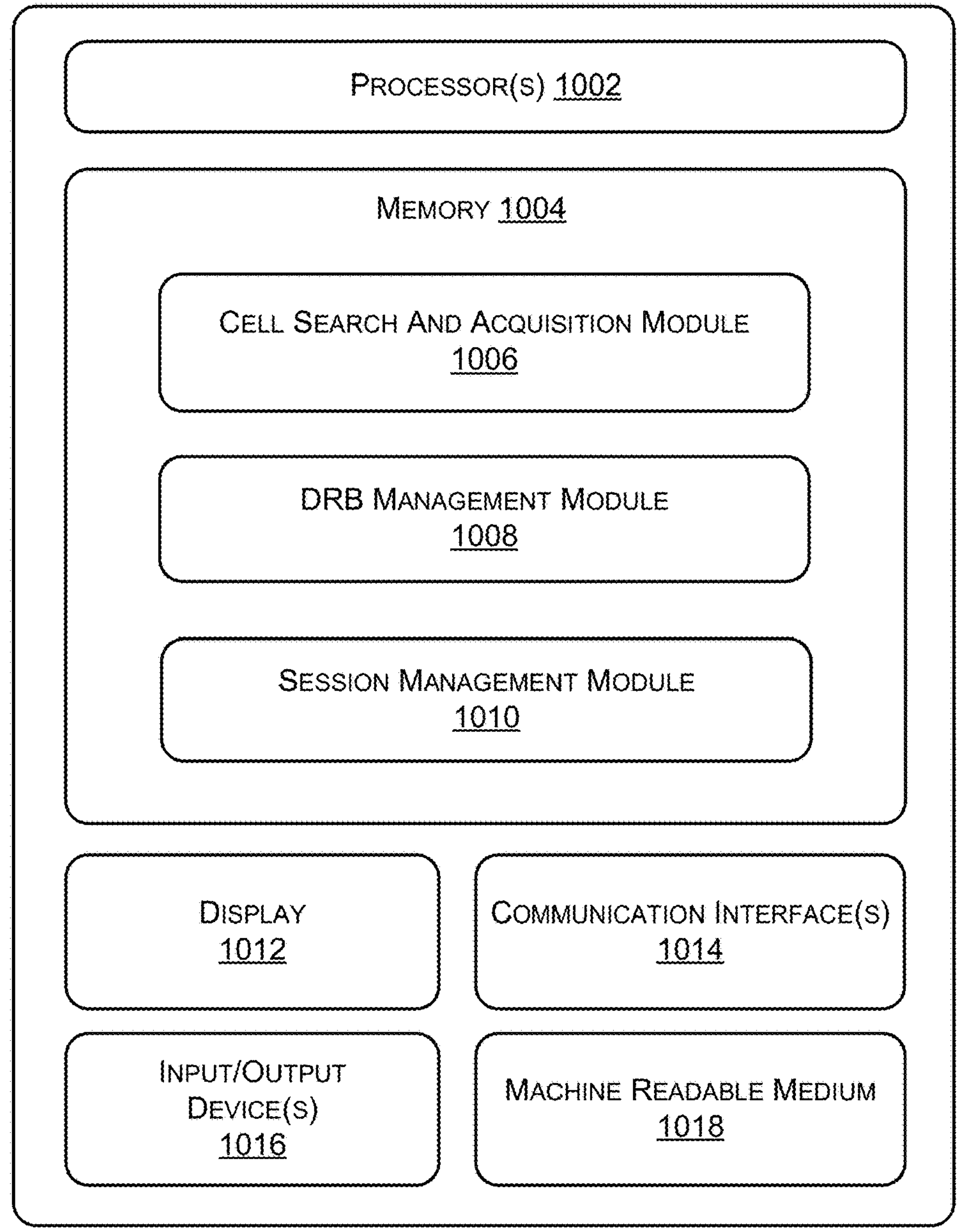
FIG. 10 illustrates an example user equipment (UE), in which methods for enhanced mobility for voice calls in a new radio band are implemented according to an example of the present disclosure.

FIG. 10 illustrates an example user equipment (UE), in which methods for enhanced mobility for voice calls in a new radio band are implemented according to an example of the present disclosure. The example UE 1000 may correspond to the UE 102, as illustrated in FIGS. 1-7.

As illustrated in FIG. 10, a user equipment (UE) 1000 may comprise processor(s) 1002, a memory 1004 storing a cell search and acquisition module 1006, a DRB management module 1008, and a session management module 1010, a display 1012, communication interface(s) 1014, input/output device(s) 1016, and/or a machine readable medium 1018.

In various examples, the processor(s) 1002 can be a central processing unit (CPU), a graphics processing unit (GPU), or both CPU and GPU, or any other type of processing unit. Each of the one or more processor(s) 1002 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1002 may also be responsible for executing all computer applications stored in memory 1004, which can be associated with common types of volatile (RAM) and/or nonvolatile (ROM) memory.

In various examples, the memory 1004 can include system memory, which may be volatile (such as RAM), non-volatile (such as ROM, flash memory, etc.) or some combination of the two. The memory 1004 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 1000. Any such non-transitory computer-readable media may be part of the UE 1000.

The cell search and acquisition module 1006 may be configured to search and acquire a suitable 5G new radio during the registration procedure. The cell search and acquisition module 1006 may acquire time and frequency synchronization with a cell and decode the cell ID. In the 5G NR standalone mode, the cell search and acquisition module 1006 may first tune to a specific frequency and try to detect the primary sync signal (PSS) and the secondary sync signal (SSS) to acquire time and frequency synchronization. Once the PSS and SSS are successfully detected, the cell search and acquisition module 1006 may obtain the information of the synchronization and the physical cell ID (PCI) and further decode the physical broadcast channel (PBCH) to read the master information block (MIB) and a series of system information blocks (SIBs). Based on the MIB and SIB, if the cell is not barred, the cell search and acquisition module 1006 may further decode the physical downlink control channel (PDCCHf) and the physical downlink shared channel (PDSCH) to obtain a public land mobile network (PLMN) ID. If the PLMN ID of the network matches with the PLMN ID list available with the UE 1000, the cell search and acquisition module 1006 may determine that the cell search is successful.

In some examples, the cell search and acquisition module 1006 may set the acquired cell as the serving cell of the UE 1000. When carrier aggregation is implemented on the 5G NR, the cell search and acquisition module 1006 may set the acquired cell as the primary serving cell and all other component carriers in the aggregated channel as the secondary serving cells.

As discussed herein, each application in the data service, multimedia service, voice service, etc., may occupy one or more DRBs to transmit the data packets. The DRB management module 1008 may be configured to the map the DRBs assigned by the gNodeB to the corresponding services.

The session management module 1010 may be configured to handle the requests related to session initiation, session modification, and session release. In some examples, a power on of the UE 1000 may trigger the session management module 1010 to send a session initiation request to the 5G core network. In some other examples, a launch of a mobile app on the UE 1000 may also trigger a session initiation request. In yet some other examples, a log out operation on the Chrome may cause the session management module 1010 to send a session release request to the 5G core network.

The communication interface(s) 1014 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 1014 can be compatible with multiple radio access technologies, such as 5G radio access technologies and 4G/LTE radio access technologies. Accordingly, the communication interfaces 1014 can allow the UE 1000 to connect to the 5G system described herein.

Display 1012 can be a liquid crystal display or any other type of display commonly used in the UE 1000. For example, display 1012 may be a touch-sensitive display screen and can then also act as an input device or keypad, such as for providing a soft-key keyboard, navigation buttons, or any other type of input. Input/output device(s) 1016 can include any sort of output devices known in the art, such as display 1012, speakers, a vibrating mechanism, and/or a tactile feedback mechanism. Input/output device(s) 1016 can also include ports for one or more peripheral devices, such as headphones, peripheral speakers, and/or a peripheral display. Input/output device(s) 1016 can include any sort of input devices known in the art. For example, input/output device(s) 1016 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1018 can store one or more sets of instructions, such as software or firmware, that embodies any one or more of the methodologies or functions described herein. The instructions can also reside, completely or at least partially, within the memory 1004, processor(s) 1002, and/or communication interface(s) 1014 during execution thereof by the UE 1000. The memory 1004 and the processor(s) 1002 also can constitute machine readable media 1018.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented on a user equipment (UE), the method comprising:

receiving a voice call on a non-voice-over-new-radio (non-VoNR) new radio (NR) band of a telecommunication network, wherein one or more protocol data unit (PDU) sessions and one or more service data flows (SDFs) are established on a user plane between the UE and the non-VoNR NR band, the one or more PDU sessions being individually established for at least one of Internet activities, mobile applications, or Internet Protocol (IP) multimedia subsystem (IMS) services, within which, each is assigned with a corresponding SDE;

determining that the non-VoNR NR band is incapable of supporting voice services;

determining a voice-over-new-radio-capable (VoNR-capable) NR band of the telecommunication network that is configured to support the voice services;

establishing the voice call on the VoNR-capable NR band; and while the voice call is ongoing on the VoNR-capable NR band, determining an ongoing data service provided to the UE on the non-VoNR NR band, transferring a second bearer assigned to the ongoing data service from the non-VoNR NR band to the VoNR-capable NR band, and transmitting data associated with the ongoing data service through the second bearer on the VoNR-capable NR band.

2. The method of claim 1, wherein the telecommunication network is a Fifth Generation (5G) network, and the non-VoNR NR band and the VoNR-capable NR band are 5G new radio (NR) frequency bands operating in a standalone mode.

3. The method of claim 1, wherein the non-VoNR NR band operates as a serving cell of the UE, and the method further comprises:

changing the serving cell of the UE from the non-VoNR NR band to the VoNR-capable NR band.

4. The method of claim 1, further comprising:

receiving, via the VoNR-capable NR band, an assignment of a first bearer for the voice call; and transmitting data associated with the voice call through the first bearer on the VoNR-capable NR band.

5. The method of claim 4, wherein the first bearer is a radio data bearer configured to transmit the data associated with the voice call in a first guaranteed bit rate (GBR).

6. The method of claim 1, wherein the second bearer is a radio data bearer configured to transmit the data associated with the ongoing data service in a second guaranteed bit rate (GBR).

7. The method of claim 1, wherein the non-VoNR NR band operates as a standalone NR band and acts as a serving cell for the UE.

8. A method implemented on a user equipment (UE) connected to a telecommunication network, the method comprising:

receiving a voice call on a non-voice-over-new-radio (non-VoNR) new radio (NR) band of the telecommunication network, the non-VoNR NR band being part of an aggregated frequency band, wherein one or more protocol data unit (PDU) sessions and one or more service data flows (SDFs) are established on a user plane between the UE and the non-VoNR NR band, the one or more PDU sessions being individually established for at least one of Internet activities, mobile applications, or Internet Protocol (IP) multimedia subsystem (IMS) services, within which, each is assigned with a corresponding SDF;

determining that the non-VoNR NR band is incapable of supporting voice services;

determining a voice-over-new-radio-capable (VoNR-capable) NR band that is configured to support the voice services, the VoNR-capable NR band being part of the aggregated frequency band; and establishing the voice call on the VoNR-capable NR band.

9. The method of claim 8, further comprising:

initiating a request to use data services of the telecommunication network; and configuring the aggregated frequency band for providing the data services to the UE, the aggregated frequency band including the non-VoNR NR band acting as a primary serving cell and the VoNR-capable NR band acting as a secondary serving cell.

10. The method of claim 9, further comprising:

re-configuring the aggregated frequency band as a reconfigured aggregated frequency band for providing the data services, including setting the VoNR-capable NR band as the primary serving cell and setting the non-VoNR NR band as the secondary serving cell; and receiving the data services through the reconfigured aggregated frequency band.

11. The method of claim 8, wherein the telecommunication network is a Fifth Generation (5G) network, and the non-VoNR NR band and the VoNR-capable NR band are 5G new radio (NR) frequency bands operating in a standalone mode.

12. The method of claim 8, further comprising:

receiving, via the VoNR-capable NR band, an assignment of a first bearer for the voice call; and transmitting data associated with the voice call through the first bearer on the VoNR-capable NR band.

13. The method of claim 12, wherein the first bearer is a radio data bearer configured to transmit the data associated with the voice call in a first guaranteed bit rate (GBR).

14. The method of claim 8, further comprising: determining, while the voice call is ongoing on the VoNR-capable NR band, an ongoing data service provided to the UE on the non-VoNR NR band; transferring a second bearer assigned to the ongoing data service from the non-VoNR NR band to the VoNR-capable NR band; and transmitting data associated with the ongoing data service through the second bearer on the VoNR-capable NR band.

15. A user equipment (UE) comprising:

a processor, a network interface configured to connect the UE to a telecommunication network, and a memory storing instructions executed by the processor to perform actions including:

receiving a voice call on a non-voice-over-new-radio (non-VoNR) new radio (NR) band of a Fifth Generation (5G) network, wherein one or more protocol data unit (PDU) sessions and one or more service data flows (SDFs) are established on a user plane between the UE and the non-VoNR NR band, the one or more PDU sessions being individually established for at least one of Internet activities, mobile applications, or Internet Protocol (IP) multimedia subsystem (IMS) services, within which, each is assigned with a corresponding SDF;

determining that the non-VoNR NR band is incapable of supporting voice services;

determining a voice-over-new-radio-capable (VoNR-capable) NR band of the 5G network that is configured to support the voice services;

establishing the voice call on the VoNR-capable NR band; and while the voice call is ongoing on the VoNR-capable NR band, determining an ongoing data service provided to the UE on the non-VoNR NR band, transferring a second bearer assigned to the ongoing data service from the non-VoNR NR band to the VoNR-capable NR band, and transmitting data associated with the ongoing data service through the second bearer on the VoNR-capable NR band.

16. The user equipment (UE) of claim 15, wherein the non-VoNR NR band and the VoNR-capable NR band are 5G new radio (NR) frequency bands operating in a standalone mode.

17. The user equipment (UE) of claim 15, wherein the non-VoNR NR band operates as a serving cell of the UE, and the actions further comprise:

changing the serving cell of the UE from the non-VoNR NR band to the VoNR-capable NR band;

receiving, via the VoNR-capable NR band, an assignment of a first bearer for the voice call; and transmitting data associated with the voice call through the first bearer on the VoNR-capable NR band.

18. A user equipment (UE) comprising:

a processor, a network interface configured to connect the UE to a telecommunication network, and a memory storing instructions executed by the processor to perform actions including:

receiving a voice call on a non-voice-over-new-radio (non-VoNR) new radio (NR) band of the telecommunication network, wherein one or more protocol data unit (PDU) sessions and one or more service data flows (SDFs) are established on a user plane between the UE and the non-VoNR NR band, the one or more PDU sessions being individually established for at least one of Internet activities, mobile applications, or Internet Protocol (IP) multimedia subsystem (IMS) services, within which, each is assigned with a corresponding SDF, the non-VoNR NR band being a primary serving cell of an aggregated frequency band;

determining that the non-VoNR NR band is incapable of supporting voice services;

determining a voice-over-new-radio-capable (VoNR-capable) NR band that is configured to support the voice services, the VoNR-capable NR band being a secondary serving cell of the aggregated frequency band; and establishing the voice call on the VoNR-capable NR band.

19. The user equipment (UE) of claim 18, wherein the non-VoNR NR band and the VoNR-capable NR band are Fifth Generation (5G) new radio (NR) frequency bands operating in a standalone mode.

20. The user equipment (UE) of claim 18, wherein the actions further comprise:

re-configuring the aggregated frequency band as a reconfigured aggregated frequency band, including setting the VoNR-capable NR band as the primary serving cell and setting the non-VoNR NR band as the secondary serving cell; and transmitting data associated with the voice call and an ongoing data services through the primary serving cell of the reconfigured aggregated frequency band.

* * * * *